United States Patent [19]

Mazanec et al.

[11] Patent Number: 4,933,054
[45] Date of Patent: Jun. 12, 1990

[54] ELECTROCATALYTIC OXIDATIVE DEHYDROGENATION OF SATURATED HYDROCARBONS TO UNSATURATED HYDROCARBONS

[75] Inventors: Terry J. Mazanec, Solon; Thomas L. Cable, Newbury, both of Ohio

[73] Assignee: The Standard Oil Company, Cleveland, Ohio

[21] Appl. No.: 25,511

[22] Filed: Mar. 13, 1987

[51] Int. Cl.$^5$ ............................................. C25B 3/02
[52] U.S. Cl. .................... 204/80; 204/59 R; 204/72; 204/78
[58] Field of Search ............... 204/59 R, 72, 80, 78; 429/40, 30

[56] References Cited

U.S. PATENT DOCUMENTS

| 4,119,503 | 10/1978 | Spaziante et al. | 204/59 R |
| 4,272,336 | 6/1981 | Vayenas et al. | 204/59 R |
| 4,327,238 | 4/1982 | Eastman | 585/661 |
| 4,329,208 | 5/1982 | Vayenas et al. | 204/59 |
| 4,368,346 | 1/1983 | Eastman | 585/658 |
| 4,389,337 | 6/1983 | Eastman | 252/462 |
| 4,396,537 | 8/1983 | Eastman | 252/437 |
| 4,462,876 | 7/1984 | DeLue et al. | 204/59 R |

FOREIGN PATENT DOCUMENTS 6130688  7/1984  Japan .

OTHER PUBLICATIONS

Hutchings et al, "Partial Oxidation of Methane Using O$_3$, N$_2$O and O$_2$ as Oxidants: A Comparitive Study", Proceedings of the 9th International Congress on Catalysts, 1988, pp. 923-929.

Otsuka et al, Chemistry Letters, (Japan) pp. 319-322, 1985.
Bull. Chem. Soc. Jpn., 57, 3286-3289 (1984).
J. N. Michaels and C. G. Vayenas, J. of Catalysis, 85, 477-487 (1984).

Primary Examiner—John F. Niebling
Assistant Examiner—Steven P. Marquis
Attorney, Agent, or Firm—Raymond F. Keller; David J. Untener; Larry W. Evans

[57] ABSTRACT

An electrocatalytic process is described for producing unsaturated hydrocarbon compounds from saturated hydrocarbon compounds. The process is conducted in an electrogenerative cell and generally comprises the steps of (A) providing a fuel cell comprising a solid electrolyte having a first surface coated with conductive metal, metal oxide or mixtures thereof capable of catalyzing the reduction of oxygen to oxygen ions, and a second surface coated with metal, metal oxide or mixtures thereof, the two conductive coatings being connected by an external circuit, (B) passing an oxygen-containing gas in contact with the first conductive coating while, (C) passing the saturated hydrocarbon compound-containing feed gas in contact with the second conductive coating, and (D) recovering unsaturated hydrocarbons.

In a preferred embodiment, the conductive metal coating on the first and second surfaces comprises a silver-containing metal composition. In another preferred embodiment, the invention comprises a continuous process for the oxidative dehydrogenation of ethane to ethylene and acetylene while generating electricity in an electrogenerative reactor.

23 Claims, 1 Drawing Sheet

4,933,054

ELECTROCATALYTIC OXIDATIVE DEHYDROGENATION OF SATURATED HYDROCARBONS TO UNSATURATED HYDROCARBONS

TECHNICAL FIELD

This invention relates to an electrocatalytic process for producing unsaturated hydrocarbons from saturated hydrocarbons. The process of the invention is a continuous process for the production of unsaturated hydrocarbons while generating electricity in an electrogenerative reactor.

BACKGROUND OF THE INVENTION

Dehydrogenation processes for the conversion of saturated organic compounds to compounds having a higher degree of unsaturation are well known. Continued efforts have been made in recent years to improve such processes in order to improve the conversion rate and selectivity to desired products. The present invention describes a continuous process for the oxidative dehydrogenation of saturated hydrocarbons such as ethane to ethylene and acetylene, and propane to propene and propyne. In the present invention, water is a byproduct, and electricity is generated.

U.S. Pat. No. 4,329,208 describes the oxidation of ethylene to ethylene oxide in an electrochemical cell which is similar to the electrochemical cell utilized in the present invention.

U.S. Pat. Nos. 4,327,238, 4,368,346, 4,389,337 and 4,396,537 describe traditional heterogeneous processes (and catalysts) for the oxidative dehydrogenation of ethane to ethylene. In the process described in these patents, cyclic experiments are described wherein air is first passed over the catalysts followed by ethane. Selectivities of up to 98% at 53% conversion are described in the examples. An article by Otsuka et al in *Chemistry Letters*, (Japan) pages 319–322, 1985, describe the conversion of methane to ethane/ethylene in an electrocatalytic cell using silver and silver/bismuth oxide as the anode materials. In an earlier publication, *Bull. Chem. Soc. Jpn.*, 57, 3286–3289 (1984), the same authors have described steam reforming of hydrocarbons through a wall of stabilized zirconia which acts as a hydrogen separator. The desired product is hydrogen with a minimum of carbon dioxide, carbon monoxide or hydrocarbons.

Michaels and Vayenas, *J. Catalysis*, 85, 477–487 (1984) have described the vapor phase electrochemical oxidative dehydrogenation of ethyl benzene to styrene on a polycrystalline platinum electrocatalyst in a stabilized zirconia electrochemical reactor. The dehydrogenation rate is reported to be enhanced by moderate current densities.

SUMMARY OF THE INVENTION

An electrocatalytic process is described for producing unsaturated hydrocarbon compounds from saturated hydrocarbon compounds. The process is conducted in an electrogenerative cell and generally comprises the steps of (A) providing a fuel cell comprising a solid electrolyte having a first surface coated with conductive metal, metal oxide or mixtures thereof capable of catalyzing the reduction of oxygen to oxygen ions, and a second surface coated with metal, metal oxide or mixtures thereof, the two conductive coatings being connected by an external circuit, (B) passing an oxygen-containing gas in contact with the first conductive coating (cathode) while, (C) passing the saturated hydrocarbon compound-containing feed gas in contact with the second conductive coating (anode), and (D) recovering unsaturated hydrocarbons. In a preferred embodiment, the conductive metal coating on the first and second surfaces comprises a silver-containing metal composition. In an another preferred embodiment, the invention comprises a continuous process for the oxidative dehydrogenation of ethane to ethylene and acetylene while generating electricity in an electrogenerative reactor.

DESCRIPTION OF THE PREFERRED EMBODIMENTS

This invention provides a continuous process for oxidizing saturated hydrocarbons to unsaturated hydrocarbons and water in an electrogenerative cell. In one embodiment, ethane can be oxidized to ethylene and acetylene, and propane can be oxidized to propene and propyne.

Figure 1:
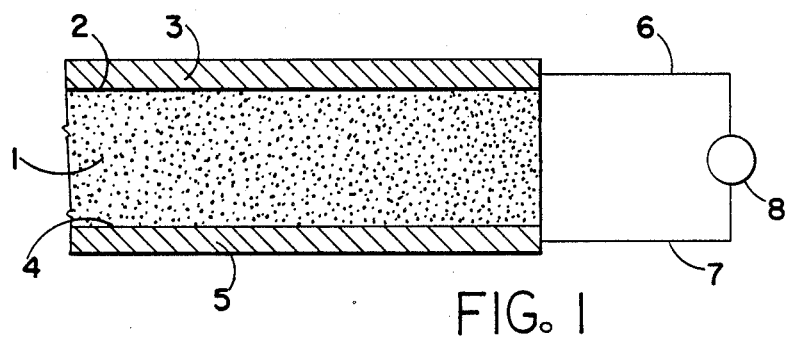
FIG. 1 is a side view, and cross-section of the apparatus suitable for carrying out the process of this invention.

The process of the present invention is conducted in an electrogenerative cell such as schematically represented in FIG. 1 wherein a core of solid electrolyte 1 is coated on one surface 2 with a catalyst 3 useful for reducing oxygen to oxygen ions. This coating provides the cathode side of the cell. On a second surface 4 of the core of solid electrolyte 1 is another coating of catalyst 5. This coating is the anode. The two coatings are connected by an external circuit through wire leads 6 and 7. An ammeter 8 may be included in the circuit. A battery may also be included in the circuit for applying an electric potential between the two conductive coatings (electrodes).

In practice, an oxygen-containing gas or gas mixture is passed in contact with the first conductive coating (the cathode), and the saturated hydrocarbon compound-containing feed gas is passed in contact with the second conductive coating (anode). As the oxygen-containing gas contacts the first conductive coating, oxygen is reduced to oxide ions which are transported through the solid electrolyte to the anode side. At the anode side (second conductive coating), the oxide ions react with the saturated hydrocarbon to produce an unsaturated hydrocarbon and water, and the electrons are released. The electrons return to the cathode side via the external circuit. In this manner, the reactor generates a current in addition to oxidizing the saturated hydrocarbons to unsaturated hydrocarbons.

The solid electrolytes used in the process of this invention can be any material which can transfer oxygen ions under the conditions of the process. Typically, oxygen ion conducting solid electrolytes are solid solutions formed between oxides containing divalent and trivalent cations such as calcium oxide, scandium oxide, yttrium oxide, lanthanam oxide, etc. with oxides containing tetravalent cations such as zirconia, thoria and ceria. Their higher ionic conductivity is due to the existence of oxygen ion site vacancies. One oxygen ion vacancy occurs for each divalent or each two trivalent ations that are substituted for a tetravalent ion in the lattice. Some of the known solid oxide transfer materials include $Y_2O_3$-stabilized $ZrO_2$, CaO-stabilized $ZrO_2$, $Sc_2O_3$ stabilized $ZrO_2$, $Y_2O_3$-stabilized $Bi_2O_3$, $Y_2O_3$-stabilized $CeO_3$, CaO-stabilized $CeO_2$, $ThO_2$, $Y_2O_3$-stabilized $ThO_2$, or $ThO_2$, $ZrO_2$, $Bi_2O_3$, $CeO_2$, or $HfO_2$ stabilized by addition of any one of the lanthanide oxides or CaO. The preferred solid electrolytes are the $Y_2O_3$-(yttria) and CaO-(calcia) stabilized $ZrO_2$ (zirconia) materials. These two solid electrolytes are characterized by their high ionic conductivity, their pure oxygen ion conduction over wide ranges of temperature and oxygen pressure, and their relatively low cost.

The conductive coating on the solid electrolyte utilized as the cathode may be any material capable of reducing oxygen to oxygen ios. Examples of metals and metal oxides useful in the preparation of the cathode include silver, nickel, gold, bismuth, platinum, palladium, copper, cobalt, chromium, iron, lanthanum manganese, lanthanum-manganese-strontium, indium oxide-stannous oxide mixtures, or any mixtures of said metals and metal oxides. The conductive coating on the second surface of the solid electrolyte (the anode) can be any of a wide variety of conductive materials capable of catalyzing the oxidative dehydrogenation of saturated hydrocarbons to unsaturated hydrocarbons. Examples of metals and metal oxides useful in forming the anode coating include silver, nickel, gold, bismuth, manganese, vanadium, platinum, paladium, ruthenium, copper, zinc, cobalt, chromium, iron, or indium oxide-stannous oxide mixtures, or any mixtures of said metals and metal oxides. Mixtures such as silver/bismuth are particularly useful.

In one preferred embodiment, the anode can also contain, in addition to and of the above-identified conductive metals, an alkali and/or alkaline earth metal or metal oxide such as lithium, sodium, potassium, rubidium, cesium, beryllium, magnesium, calcium, strontium, barium and the corresponding oxides. The combination of lithium and magnesium is particularly useful. The amount of alkali and/or alkaline earth metal included in the coating (anode) may be varied over a wide range such as from about 1% to about 50% by weight and preferably between about 5% to about 20% by weight. Specific examples of such mixed anodes include Cu/Li/Mg, Ag/Li/Mg, Ag/Sm/Li/Mg, and Ag/Bi/Li/Mg.

The alkali and/or alkaline earth metal or metal oxides may be included in the conductive material either before or after the conductive material is deposited on the surface of the solid electrolyte. It is also possible to dope, coat, or otherwise treat the anode with additional materials to influence its stability, structure and/or reactivity for surface interactions with the saturated hydrocarbons. In one embodiment of this invention, the anode can be "blackened" by rapidly changing the polarity of an applied potential while maintaining the electrolyte at an elevated temperature.

The oxygen-containing gas which is passed in contact with the first conductive coating or cathode can be air, pure oxygen, or a-y other gas containing at least 1% oxygen. In another embodiment, the oxygen-containing gas does not contain dioxygen, but rather contains oxygen in other forms such as $N_2O$, $CO_2$, $SO_2$, $NO_2$, NO, etc. Preferably, the oxidizing gas is air.

The saturated hydrocarbon-containing feed gases which are treated in accordance with the process of the present invention may comprise aliphatic hydrocarbons containing from 2 to about 6 carbon atoms, cycloaliphatic hydrocarbons containing 5 or 6 carbon atoms, and mixtures thereof. Preferably, the saturated hydrocarbons are aliphatic hydrocarbons, and more preferably, the saturated hydrocarbons treated in accordance with the process of the present invention will be ethane or ethane-containing feed gases or propane containing feed gases. The ethane-containing feed gas can be natural gas, a methane pyrolysis exit gas, an oxidative coupling exit gas, or any other gas which contains at least 1% ethane. The natural gas can be either wellhead natural gas or processed natural gas. The composition of the processed natural gas varies with the needs of the ultimate user. A typical processed natural gas composition contains about 70% by weight of methane, about 10% by weight of ethane, 10% to 15% of $CO_2$, and the balance is made up of smaller amounts of propane, butane and nitrogen.

In another embodiment of this invention, ethane is mixed with other saturated aliphatic hydrocarbons such as propane, butane, isobutane and/or pentane. The saturated hydrocarbon gassed can be mixed with any inert diluent such as nitrogen, helium, neon, argon, krypton, xenon, or any other gas, including steam, which does not interfere with the o-idative dehydrogenation of the hydrocarbon. Nitrogen and methane are diluents of choice.

The preferred cathode and anode materials comprise silver-containing metal compositions. In one preferred embodiment, the anode material will comprise silver-containing metal compositions which also contain bismuth and optionally, an ahkali and/or alkaline earth metal or metal oxide. In another preferred embodiment, the second conductive coating, namely, the anode, comprises a platinum-containing metal composition.

Figure 2:
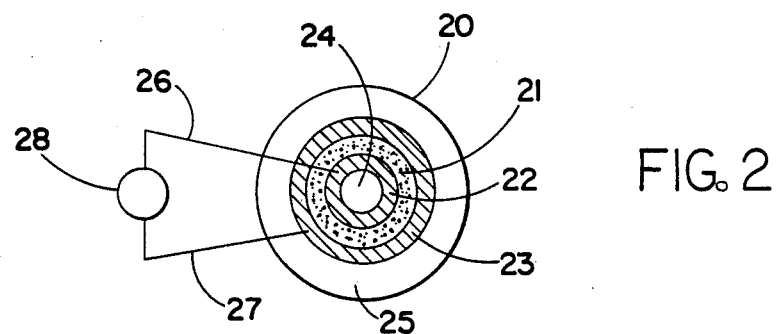
FIG. 2 is a top view, and cross-section of a fuel cell reactor useful for carrying out the process of the invention.
Figure 3:
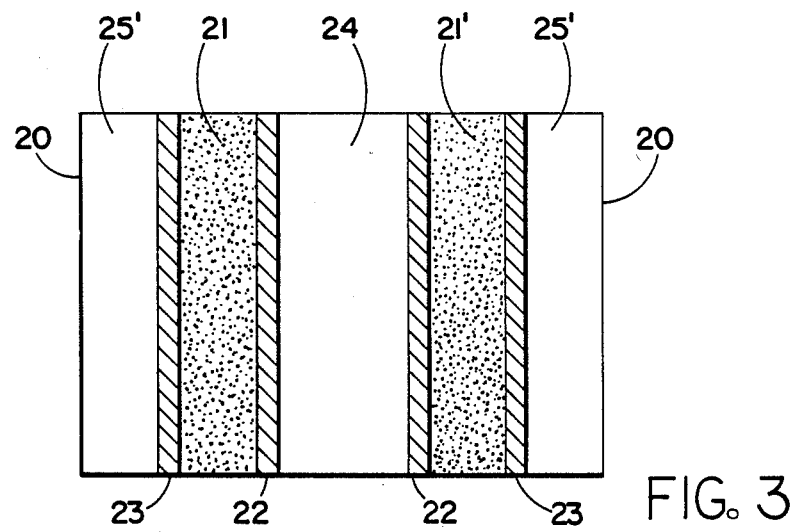
FIG. 3 is a side view, and cross-section of the reactor shown in FIG. 2.

The present invention may be further exemplified by reference to FIGS. 2 and 3. FIG. 2 is a top view of a fuel cell useful in conducting the process of the present invention, and FIG. 3 is a side view of the same cell. In both FIGS. 2 and 3, the fuel cell comprises a shell 20 in which is placed a circular solid cylindrical electrolyte cor- 21 The inside surface of the solid electrolyte 21 is coated with an electrically conductive metal or metal oxide which serves as the cathode 22. The outer surface of the solid electrolyte 21 is coated with an electrically conductive material 23 which serves as the anode. A wire lead 26 is attached to the inside coating 22, and a second wire lead 27 is attached to the outside coating 23, and the two wire leads are connected to form an external circuit through ammeter 28. A battery may be connected in series with the ammeter. As can be seen from the construction illustrated in FIGS. 2 and 3, the cell contains an inner open space 24 through the center of the cell and an outer open space 25 between the outer coating 23 or anode and the shell 20.

In practice, the process of the present invention is conducted with an apparatus such as illustrated in FIGS. 2 and 3 by passing an oxygen-containing gas through the inner open space 24 and a saturated hydrocarbon-containing gas through the outer open space 25. The oxygen-containing gas which contacts the inside conductive coating 22 is converted to oxygen ions which migrate through the solid electrolyte 21 to contact the outside conductive coating 23. At the surface of the outside coating 23, the oxygen ion reacts with the saturated hydrocarbon contacting the outside conductive coating 23 to form one or more unsaturated hydrocarbons During this reaction, the oxygen ion loses two electrons which travel from the outer conductive coating 23 through the circuit formed by leads 26 and 27 and the ammeter/battery 28 to the inner surface coating 22.

In another embodiment, the anodes and cathodes are reversed. That is, inside conductive coating 22 is the anode and the outer conductive coating 23 is the cathode. In this embodiment, the oxygen containing gas is passed through the outer open space 25, and the hydrocarbon passed through the inner or central open space 24. Otherwise, the process in this embodiment is the same as the embodiment discussed above.

The process of the present invention generally is conducted at an elevated temperature of at least about 500° C. More generally, the process will be conducted at a temperature of from about 500° C. to about 1100° C. In a preferred embodiment, for example, when the saturated hydrocarbon gas is ethane, the reaction is conducted at a temperature of about 700° C. to about 950° C.

The process of the present invention generally is conducted at a pressure of from about 0.1 to about 100 atmospheres, more preferably between about 0.5 to about 10 atmospheres. A particularly preferred pressure is 1 atmosphere.

The oxidative dehydrogenation reaction which occurs at the anode is fast, and contact times of about 0.1 to about 100 seconds are sufficient to produce the desired conversion to unsaturated hydrocarbons. More generally contact times of about 1 to 20 seconds are sufficient and preferred.

In one embodiment of the invention, the conversion of saturated hydrocarbons to unsaturated hydrocarbons is improved by applying an electric potential between the anode and cathode. Generally, a potential of up to about 4 volts can be applied between the electrodes. The desired electric potential can be applied by the use of a battery installed in the external circuit formed by 26, 27 and 28 in FIGS. 2 and 3.

In the following specific examples, the saturated hydrocarbons were treated in accordance with the method of the present invention in a laboratory reactor made from a 60 cm. long (10 mm. OD, 8 mm. ID) tube of 8% yttria-stabilized zirconia obtained from Zircoa Products (Corning). The inside of the tube is coated with a thin layer of silver ink (Engelhard A3148) diluted with terpineol to provide a permeable cathode. A stripe of silver ink is painted onto the outside of the tube from one end to about the center. The tube is heated in air at 750° C. for about 15 minutes.

The outer surface of the tube then is coated with the anode material, overlapping slightly the silver stripe. The silver-containing anodes are prepared from silver ink or silver oxide slurried with acetone. The bismuth-containing anodes are prepared by adding bismuth nitrate solution to the silver ink or silver oxide slurry. The Ag:Bi ratio is about 5:1.

Specific examples of other anode coatings useful in the invention, and a method of preparing such coatings are as follows:

Ag: A tube is coated with silver ink (Engelhard A 3148).

Ag/Bi: A tube is coated with a mixture of silver oxide ($Ag_2O$) and bismuth nitrate [$Bi(NO_3)_3.5H_2O$] in water (Ag/Bi=2:1).

Ag/Sm: A tube is coated with a mixture of silver oxide ($Ag_2O$) and samarium nitrate [$Sm(NO_3)_3.5H_2O$] in water (Ag:Sm=2:1).

Ag/Li/Mg A tube is coated sequentially with silver ink (A3148), and then with a slurry of magnesium oxide (MgO) and lithium carbonate [$Li_2CO_3$] (14.6% w lithium) in water.

Ag/Bi/Li/Mg: A tube is given a Ag/Bi coating as above and then is coated with a slurry of magnesium oxide (MgO) and lithium carbonate [$Li_2CO_3$] (14.6% w lithium) in water.

Ag/Sm/Li/Mg: The tube coated sequentially with
(1) samarium nitrate [$Sm(NO_3)_3.5H_2O$] as a water solution;
(2) a mixture of magnesium oxide [MgO] and lithium carbonate [$Li_2CO_3$] (14.6% w Li) as a slurry in water; and
(3) slurry of silver oxide [$Ag_2O$] in acetone. After each coating, the coating is heated to dryness at about 250° C. After the final coat, the tube is heated to about 700° C.

Ag/Mo: The tube is coated with a solution of ammonium heptamolybdate and then silver ink (Engelhard A 3148).

Ag/Ho: The tube is coated with a solution of holmium nitrate $Ho(NO_3).5H_2O$] in water and then a slurry of silver oxide in acetone.

Bi/Mo: A mixture of ammonium heptamolybdate [$(NH_4)_6Mo_7O_{24}.4H_2O$] and bismuth nitrate [$Bi(NO_3)_3.5H_2O$] with Bi:Mo=2:3 in water is applied to the tube, dried, and heated to 700° C.

Pt/Bi: A mixture of tetraamine platinum d nitrate [$Pt(NH_3)_4(NO_3)_2$] and bismuth nitrate in water (Pt:Bi=2:1) is applied to the tube, dried, and heated at 700° C.

Ag/Mo/Bi: A Ag/Mo coated tube prepared as above is coated with a solution of bismuth nitrate.

Ni/Li: A slurry of nickel oxide [NiO] and lithium carbonate in water is used (Ni:Li=9:1).

Cu: A slurry of copper (II) oxide [CuO] in water is used.

Cu/Li/Mg: A tube is coated with a slurry of magnesium nitrate and lithium carbonate (14.6% w Li) in water, and then is coated with a slurry of CuO in water.

Pt: A tube is coated with platinum ink from Engelhard (# 6926).

Pt/Bi: A platinum anode prepared as above is coated with a slurry of bismuth oxide [$Bi_2O_3$] in water.

Silver wires are attached to the ends of the two electrodes with solder. A 40 cm. section of 14 mm. OD quartz tube is fitted over the center section of the zirconia tube using SWAGELOK TM tube fittings and teflon ferrules. A SWAGELOK TM tube fitting also is attached to each end of the zirconia tube which extends out of the quartz sleeve. The assembly is placed in a split furnace capable of heating to 1100° C., and the silver wires are connected through an ammeter.

The electrodes are conditioned as follows: air is passed through the inside of the zirconia tube at 50 cc./min. Nitrogen is passed through the space between the zirconia and quartz tubes at the rate of 50 cc./min., and the tube is heated to 700° C. over the course of about 2 hours. As the reactor is heated, a current is observed in the circuit at about 380° C. At about 480° C. the current changes directions (−0.3 milliamp) and stays negative until the temperature reaches 545° C. The current then becomes positive (electron flow through the circuit from the anode to the cathode) and remains positive thereafter. After 10 minutes at 700° C., the nitrogen flow is replaced by the saturated hydrocarbon, and the experiment commences.

In the following experiments, the saturated hydrocarbon is ethane and the feed rate is adjusted to 20 cc./min. Samples of the gaseous products are obtained at about 20 minute intervals, and the gas samples are analyzed by gas chromatography on either a Carle Series S 111 H or a Carle Series S 400 gas chromatograph outfitted to analyze refinery gas mixtures. The results summarized below in Table I are based upon averages of at least three gas samples, and the electric current values are steady-state values. In some of the experiments, an external potential was applied by means of a Hewlett-Packard 6214B power supply connected in series with the ammeter.

In Examples 1 through 6 and in the Control example, a silver cathode is utilized, and the anode is a silver/bismuth anode prepared as described above. All of the experiments are conducted at atmospheric pressure.

TABLE I

| Example | Temp. (°C.) | Applied Voltage | Current (mA) | $C_2H_6$ Converted (%)* | $C_2H_4$ Select. (%)** | $H_2$ Select. (%)*** |
|---|---|---|---|---|---|---|
| Cont. 1 | 700 | — | — | 5.49 | 97.4 | 87.3 |
| 1 | 700 | 0.0 | 97 | 6.92 | 97.9 | 0.0 |
| 2 | 700 | 0.9 | 252 | 10.61 | 96.9 | 11.9 |
| 3 | 700 | 0.0 | 74 | 4.81 | 94.0 | 0.0 |
| 4 | 700 | 0.9 | 252 | 8.95 | 97.2 | 0.0 |
| 5 | 750 | 0.0 | 95 | 16.50 | 98.6 | 84.6 |
| 6 | 750 | 0.9 | 160 | 19.06 | 98.7 | 71.8 |

*$C_2H_6$ Conversion = $\frac{\text{Moles C in all Products}}{\text{Moles C fed as } C_2H_6} \times 100$

**$C_2H_4$ Selectivity = $\frac{\text{Moles C in } C_2H_4}{\text{Moles C in all products}} \times 100$

***$H_2$ Selectivity = $\frac{\text{Moles } H_2 \text{ produced}}{\text{Moles } C_2H_4 \text{ produced}} \times 100$ The results of Examples 1–4 indicate that hydrogen is not produced as a significant by-product in the electogenerative dehydration of ethane as compared to Control-1 in which a purely thermal conversion occurs (no external circuit) and significant quantities of hydrogen are produced. A comparison of the results of Examples 2 and 4 hows the beneficial effect on conversion of ethane to ethylene when a potential is applied. The selectivity for ethylene does not appear to be significantly changed by introducing an applied potential.

The results of Examples 5 and 6 show that conversion and selectivity for ethylene is high even at the higher temperature, and hydrogen selectivity is increased.

The currents observed and recorded in Examples 1–6 show that electricity can be generated as a useful by-product by the oxidative dehydrogenation of ethane to ethylene.

The general procedure and apparatus used in the above examples is used in the following examples except that the feed rate of ethane is varied as indicated in Table II, and the anode may be a silver anode or silver/ruthenium anode, or platinum anode as indicated in Table II. The silver/ruthenium anode is prepared using a mixture of silver ink and ruthenium oxide hydrate (Ag:Ru=10:1).

TABLE II

| | Circuit | Anode | Temp °C. | $C_2H_6$ sccm | Volt Appl. | $C_2H_6$ Conv % | $C_2H_4$ Sel % | Yield $C_2H_4$ % |
|---|---|---|---|---|---|---|---|---|
| C-1 | Open | Ag | 700 | 6.00 | — | 20.64 | 94.00 | 19.40 |
| C-2 | Open | Ag | 700 | 6.00 | — | 20.76 | 94.00 | 19.51 |
| 1 | Closed | Ag | 700 | 6.00 | — | 21.10 | 94.90 | 20.02 |
| 2 | Closed | Ag | 700 | 6.00 | 0.70 | 26.46 | 90.08 | 23.84 |
| 3 | Closed | Ag | 700 | 6.00 | 0.70 | 23.49 | 89.77 | 21.09 |
| 4 | Closed | Ag | 700 | 6.00 | 1.10 | 30.13 | 82.84 | 24.96 |
| C-3 | Open | Ag | 700 | 20.00 | — | 6.96 | 97.90 | 6.81 |
| C-4 | Open | Ag | 700 | 20.00 | — | 9.27 | 97.90 | 9.08 |
| 5 | Closed | Ag | 700 | 20.00 | — | 8.86 | 93.85 | 8.32 |
| 6 | Closed | Ag | 700 | 20.00 | — | 9.15 | 97.30 | 8.90 |
| 7 | Closed | Ag | 700 | 20.00 | 0.60 | 11.81 | 92.10 | 10.88 |
| 8 | Closed | Ag | 700 | 20.00 | 0.60 | 11.34 | 91.68 | 10.40 |
| 9 | Closed | Ag | 700 | 20.00 | 2.00 | 17.08 | 87.03 | 14.86 |
| C-5 | Open | Ag | 800 | 20.00 | — | 69.26 | 94.64 | 65.55 |
| 10 | Closed | Ag | 800 | 20.00 | — | 68.60 | 95.00 | 65.17 |
| 11 | Closed | Ag | 800 | 20.00 | 0.70 | 73.50 | 92.40 | 67.91 |
| 12 | Closed | Ag | 800 | 20.00 | 1.50 | 72.00 | 92.70 | 66.74 |
| 13 | Closed | Ag/Ru | 800 | 20.00 | — | 74.85 | 82.00 | 61.38 |
| 14 | Closed | Ag/Ru | 800 | 20.00 | 1.00 | 77.40 | 80.00 | 61.92 |
| 15 | Closed | Ag/Ru | 800 | 20.00 | 2.00 | 79.10 | 79.70 | 63.04 |
| C-8 | Open | Pt | 750 | 20.00 | — | 34.10 | 92.20 | 31.50 |
| 16 | Closed | Pt | 750 | 20.00 | — | 35.70 | 91.70 | 32.70 |
| 17 | Closed | Pt | 750 | 20.00 | 0.60 | 35.10 | 91.40 | 32.10 |
| 18 | Closed | Pt | 750 | 20.00 | 1.40 | 35.40 | 90.20 | 31.90 |
| C-7 | Open | Pt | 750 | 6.00 | — | 51.10 | 86.30 | 44.10 |
| 19 | Closed | Pt | 750 | 6.00 | — | 53.30 | 85.40 | 45.50 |
| 20 | Closed | Pt | 750 | 6.00 | 0.60 | 55.00 | 84.30 | 46.30 |
| C-6 | Open | Pt | 750 | 3.00 | — | 57.90 | 79.40 | 46.00 |
| 21 | Closed | Pt | 750 | 3.00 | — | 65.60 | 78.80 | 51.70 |

The results of the examples and control examples (designated C-1 etc.) summarized in Table II generally show the increase in yield of ethylene by the electrocatalytic process of the invention (closed circuit) as compared to the yield of ethylene obtained by the non-oxidative thermal process (open circuit). Also, the results show the generally increased yields of ethylene when an electrical potential is applied between the anode and cathode.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An electrocatalytic process for producing unsaturated hydrocarbon compounds from saturated hydrocarbon compounds which comprises
   (A) providing an electrochemical cell comprising a solid electrolyte having a first surface coated with conductive metal, metal oxide or mixtures thereof capable of catalyzing the reduction of oxygen to oxygen ions, and a second surface coated with a conductive metal, metal oxide or mixtures thereof, the two conductive coatings being connected by an external circuit,
   (B) passing an oxygen-containing gas in contact with the first conductive coating at a temperature of from about 500° C. to about 950° while,
   (C) passing a feed gas in contact with the second conductive coating at a temperature of from about 500° C. to bout 950° C., wherein the feed gas contains a saturated aliphatic hydrocarbon compound having from 2 to about 6 carbon atoms, a saturated cycloaliphatic hydrocarbon compound having from 5 to 6 carbon atoms, or a mixture thereof and
   (D) recovering unsaturated hydrocarbons.

2. The process of claim 1 wherein said solid electrolyte comprises yttria stabilized zirconia or calcia stabilized zirconia.

3. The process of claim 1 wherein the first conductive coating comprises silver, nickel, gold, bismuth, platinum, palladium, copper, zinc, cobalt, chromium, lanthanum-manganese, lanthanum-manganese-strontium, iron, or indium oxide-stannous oxide mixtures, or any mixtures of said metals.

4. The process of claim 3 wherein the first conductive coating comprises silver-containing metal compositions.

5. The process of claim 1 wherein the second conductive coating comprises silver, nickel, gold, bismuth, manganese, vanadium, platinum, palladium, ruthenium, copper, zinc, cobalt, chromium, iron, or indium oxide-stannous oxide mixtures, or any mixtures of said metals.

6. The process of claim 5 wherein the second conductive coating also contains one or more alkali and/or alkaline earth metals.

7. The process of claim 1 wherein the second conductive coating comprises a silver-containing metal composition.

8. The process of claim 1 wherein the second conductive coating comprises a platinum-containing metal composition.

9. The process of claim 7 wherein the second conductive coating also contains bismuth.

10. The process of claim 1 wherein the feed gas comprises an aliphatic hydrocarbon containing from 2 to about 6 carbon atoms.

11. The process of claim 1 wherein the feed gas comprises ethane or propane.

12. The process of claim 1 conducted at a pressure of from about 0.1 to about 100 atmospheres.

13. The process of claim 1 conducted at a pressure of from about 0.5 to about 10 atmospheres.

14. The process of claim 1 wherein an electric potential is applied between the two conductive coatings.

15. An electrocatalytic process for producing ethylene from ethane which comprises
   (A) providing an electrochemical cell comprising a solid electrolyte capable of transporting oxygen ions and having a firs surface coated with conductive metal, metal oxide or mixtures thereof capable of catalyzing the reduction of oxygen to oxygen ions, and a second surface coated with conductive metal, metal oxides or mixtures thereof, the two conductive coatings being connected by an external circuit,
   (B) passing an oxygen-containing gas in contact with the first conductive coating at a temperature of from about 500° C. to about 950° C. while,
   (C) passing an ethane-containing feed gas in contact with the second conductive coating at a temperature of from about 500° C. to about 950° C., and
   (D) recovering an ethylene-containing gas.

16. The process of claim 15 wherein the first conductive coating and the second conductive coating comprise silver-containing metal compositions.

17. The process of claim 16 wherein the second conductive coating also contains bismuth.

18. The process of claim 16 wherein the second conductive coating also contains alkali and/or alkaline earth metals.

19. The process of claim 16 wherein the second conductive coating also contains lithium and magnesium.

20. The process of claim 15 conducted at a temperature of from about 700° C. to about 950° C.

21. The process of claim 15 conducted at a pressure of from about 0.5 to about 10 atmospheres.

22. The process of claim 15 wherein an electric potential is applied between the two conductive coatings.

23. An ethylene-containing gas prepared in accordance with the process of claim 15.